Figure 1:

(No Model.) 2 Sheets—Sheet 1.

T. HYATT.
ILLUMINATING VAULT COVERS OR GRATING TILES AND SURFACES MADE OF THE SAME.

No. 286,542. Patented Oct. 9, 1883.

Witnesses:
T. C. Brecht
Guy. De Mott.

Inventor:
Thaddeus Hyatt

N. PETERS, Photo-Lithographer, Washington, D. C.

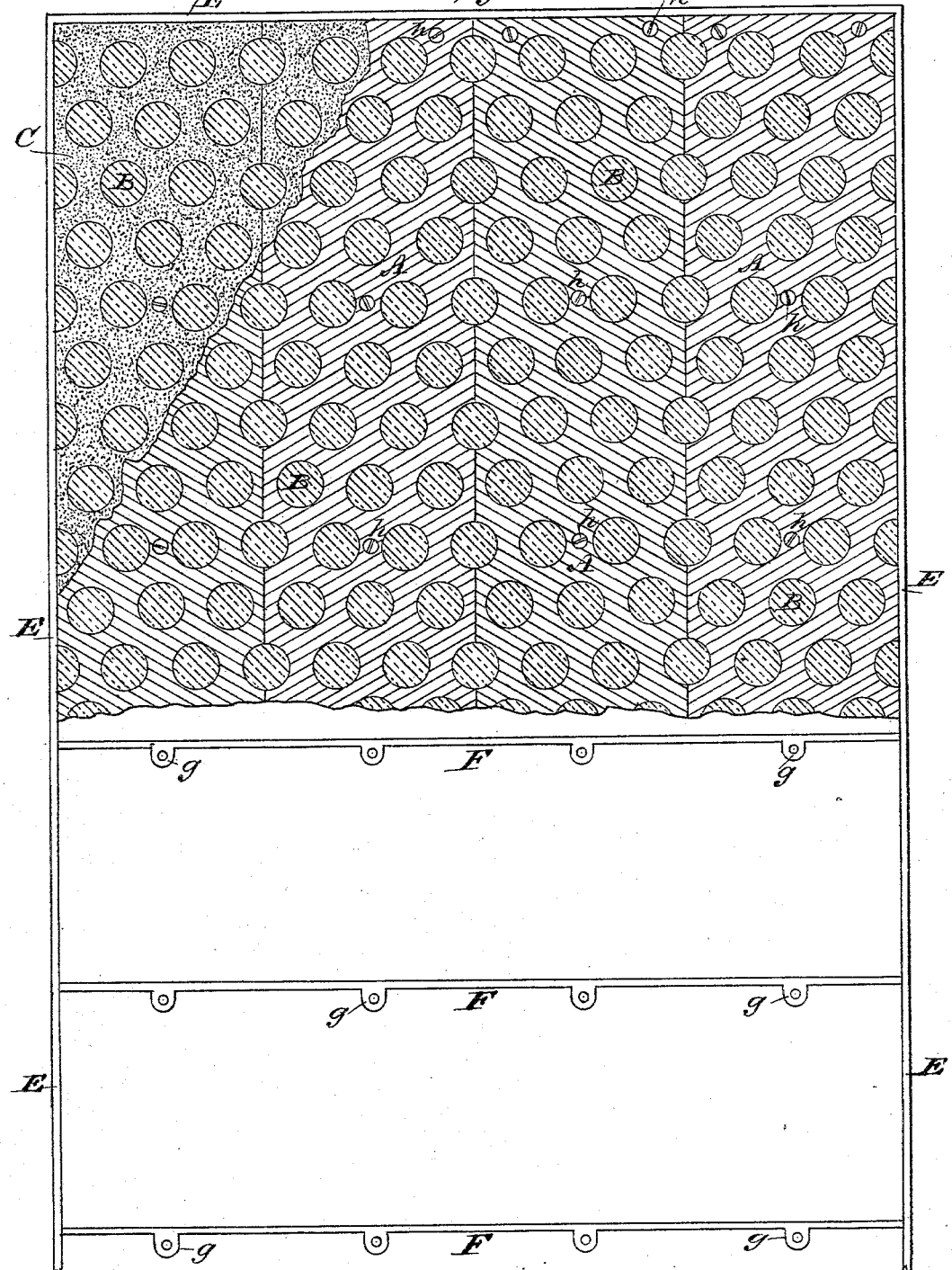

UNITED STATES PATENT OFFICE.

THADDEUS HYATT, OF NEW YORK, N. Y.

ILLUMINATING VAULT-COVERS OR GRATING-TILES AND SURFACES MADE OF THE SAME.

SPECIFICATION forming part of Letters Patent No. 286,542, dated October 9, 1883.

Application filed September 11, 1883. (No model.)

*To all whom it may concern:*

Be it known that I, THADDEUS HYATT, a citizen of the United States, residing at the city of New York, in the county of New York and State of New York, have invented certain new and useful Improvements in Illuminating Vault-Covers or Grating-Tiles and Surfaces made of the same, of which the following is a description, reference being had therein to the accompanying drawings, making part of this specification.

My invention relates to the sort of illuminating gratings and constructions known to the trade by the name of "concrete lights," made by combining an overlayer of hydraulic cement or concrete with glasses and a perforated floor-plate or grating-glass holder.

The object of my invention is to cheapen and facilitate the making of such lights and constructions by the employment of gratings in the form of bars, slats, or strips more readily cut to length than wide plates, and made with half-holes or partial holes along the matching edges, so that the lateral union of them produces whole hole-gratings of any width, that, when set with glass and overlaid with concrete, are perfectly water-tight, however many joints there may be by reason of the number of bars or slats employed, the glasses set along the lines where the slats are joined transmitting light equally with the glasses set along the lines in the whole holes, and the concrete overlayer between the glasses being continuous and of uniform appearance between the glasses over the entire surface, of howsoever many strips, pieces, or plates it may be made.

The object of my invention, furthermore, as a means of cheapening concrete lights, consists in making use of perforated wood plates, slats, bars, or gratings, as aforesaid, in place of metal, in combination with glasses and concrete, such wood plates or gratings having been previously treated chemically by charring, vulcanizing, or being otherwise treated to insure the wood against decay by any of the methods set forth, alluded to, or specified in my American Letters Patent No. 286,012, and dated October 2, 1883, for the making of illuminating-gratings of such material when not overlaid with concrete.

A further object of my invention, as a means of cheapening concrete lights, consists in making use of perforated plates, slats, bars, or gratings, as aforesaid, made from paper, boards, or material of the character set forth, alluded to, or specified in my American Patent No. 272,551, as material for illuminating-gratings, and dated the 20th day of February, 1883, as a substitute for metal ones, in combination with glasses and concrete, as aforesaid.

A further object of my invention, as a means of cheapening concrete lights made of slats, bars, or plates of metal, wood, or wood material, as aforesaid, and formed with half-holes or partially-formed holes, as aforesaid, at the junction-edges, in combination with glasses and concrete, as aforesaid, consists in attaching the glasses to the floor plate or grating by means of screw-threads formed on the glass, and threads to match formed on the sides of the light-holes, in connection with the screw-threads, corrugations, or serrations upon the sides of the glass above the floor-plate, or in the sides of the mounts, when glasses set in mounts are employed, as a means of holding the concrete overlayer to the flat face of the floor-plate.

A further object of my invention, as a means of cheapening concrete lights, where the glasses are formed with screw-threaded shanks, consists in combining with the screw-threads one or more projections, or a fillet made upon the glass, as a stop to bring the glass to its proper bearing and prevent it from going too far into the light-hole.

Figure 2:
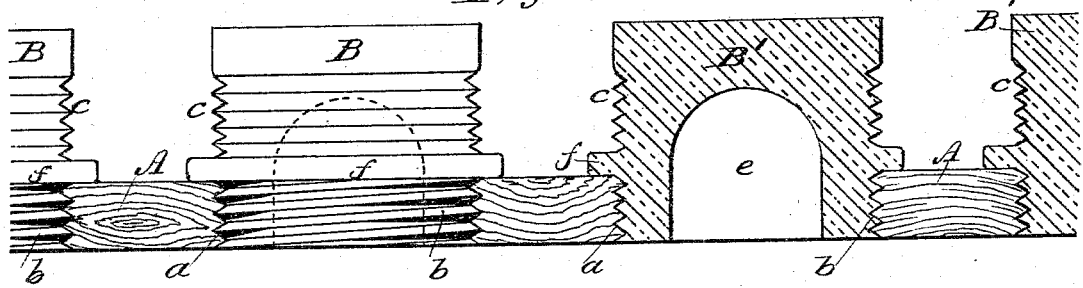
Figure 3:
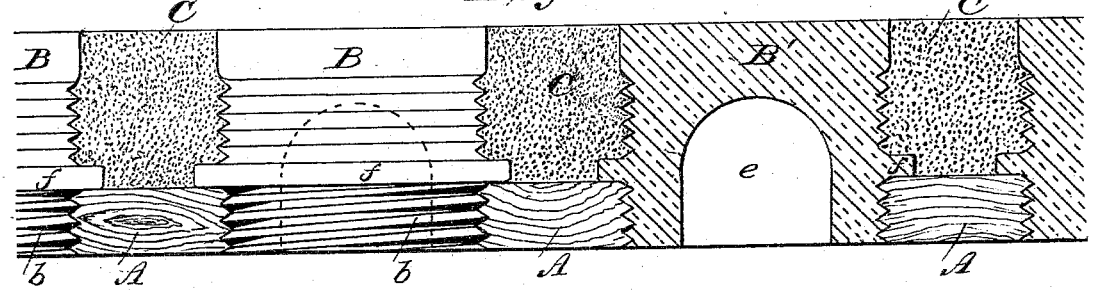
Figures 4, 5:
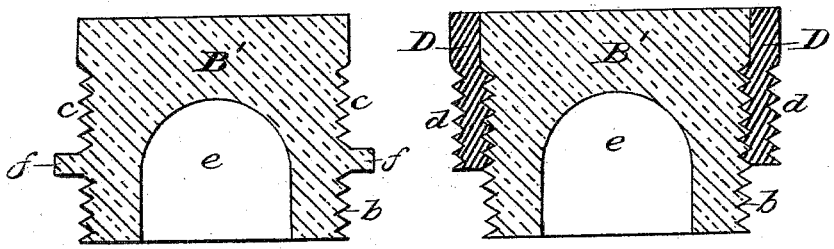
Figure 6:
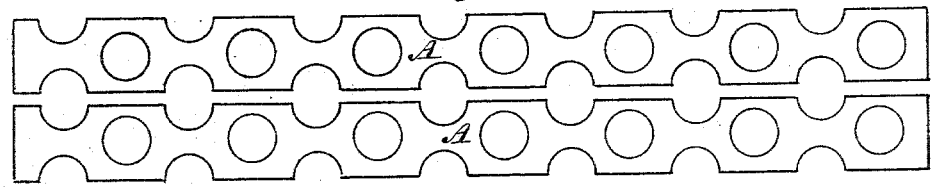

Figure 1 represents, of full size, a portion of a floor-plate with no glasses, the purpose being to exhibit the screw-threads of the light-holes, and to show the plate made of wood or wood material, or so-called "artificial wood;" Fig. 2, the same with screw-glasses; Fig. 3, same with facing of concrete between the glasses. Fig. 4 represents one of the glasses. Fig. 5 represents one of the glasses set in a mount, the mount acting as a stop. Fig. 6 represents slats formed with half-holes. Fig. 7 represents floor-plates in widths greater than slats of bars, and is likewise designed to represent construction, (as in making roofs and roof-pavements,) or the method of joining the slats, bars, or plates to produce uniform lines of light-transmitting glasses, in combination with a continuous facing of concrete over the seams between the plates, planks, or bars between the glasses, the figure being designed to illustrate specially a construction where the floor-plates are made of wood or wood material, and an area-covering construction.

A indicates the floor plate, tile, grating, or glass-holder; $a\,a$, screw-threads in the sides of the light-holes; B, a glass, (seen in side elevation;) B', glass in section; $e$, bottom part of the glass; $b\,b$, screw-threads on the shank of the glass; $c\,c$, screw-threads, corrugations, or serrations above; $f\,f$, projections, stop, or shoulder on glass, to regulate its descent into the floor-plate. C indicates the concrete facing; D, mount of lead or material around the glass; $d\,d$, screw-threads, serrations, or corrugations on mount; E, border of the cast-iron foundation-frame; F, cross-bars of foundation-frame; $g\,g$, lugs on the cross-bars, to fasten floor-plates to; $h\,h$, screws that take into the lugs.

Like letters refer to like parts in all the figures.

In carrying my invention into practice, I prefer to make use of an iron foundation-frame made, substantially in the way they are commonly constructed, of sections, and put together at the building where the work is to be laid. E F, Fig. 7, represent such a frame. The floor-plates, in the form of slats, planks, or long plates, are laid crosswise to and over the cross-bars in the manner of laying floor-plank in making floors of wood. The screws $h\,h$ pass through the illuminating strips or planks into the lugs $g\,g$ by being screwed to them, or they may be screw-bolts with nuts. After the floor-plates are all in place the glasses are applied and screwed into the matched half-holes at the junction-lines, as well as into the whole holes in the body of the plates or planks, and all being brought to a uniform surface-level, the facing of concrete is then troweled in, as shown at C, Fig. 7, which represents a portion of the work completed.

Vault-covers or coal-hole plates I make substantially as represented by Fig. 7, an external cast-iron ring being employed as the border, but no cross-bars required, a ledge only being needed on the inside of the ring to fasten the perforated plate or slats to.

What I claim as my invention, and desire to secure by Letters Patent, is—

1. A concrete light, vault-cover, or construction composed of bars, slats, plates, or planks formed with half-holes along the junction-edges, to give light, put together laterally or joined to make whole light-holes, and set with glass, in combination with a facing of non-slipping material—hydraulic cement or concrete—substantially as and for the purpose herein set forth and illustrated.

2. A concrete light, vault-cover, or construction wherein the floor plate or plates are made of wood or wood material and set with glasses, to give light, as set forth in my Patents No. 272,551, 1883, and No. 286,012, 1883, as aforesaid, in combination with an over-layer or facing of concrete put between the glasses, substantially as and for the purposes herein set forth and illustrated.

3. A concrete light, vault-cover, or grating-tile wherein the floor-plate is made of bars, slats, plates, or planks formed with half-holes along the junction-edges, to give light, put together laterally or joined to make whole light-holes, when the holes of the same are formed with screw-threads, in combination with glasses screwed into the same, and a facing of non-slipping material—hydraulic cement or concrete—is put over the seams and between the glasses, substantially as and for the purposes herein set forth and illustrated.

4. A concrete light, vault-cover, or construction wherein the floor plate or plates are made of wood or wood material and set with glasses, to give light, as set forth in my Patents No. 272,551, 1883, and No. 286,012, 1883, as aforesaid, when the holes of the same are formed with screw-threads, in combination with glasses screwed into the same, and a facing of non-slipping material—hydraulic cement or concrete—is put over the floor-plate between the glasses, substantially as and for the purposes herein set forth and illustrated.

5. A concrete light, vault-cover, or construction wherein the glasses are formed with screw-threaded shanks, in combination with one or more projections or a fillet made upon the glass to act as a stop, substantially as and for the purposes herein set forth and illustrated.

6. A concrete light, vault cover, or construction wherein the glasses are set in mounts formed externally with screw-threads, corrugations, or serrations, in combination with screw-threads upon the shanks of the glasses for fastening them to the floor-plate, substantially as and for the purposes herein set forth and illustrated.

7. A concrete light, vault-cover, or construction wherein the glasses are set in mounts formed externally with screw-threads, corrugations, or serrations, substantially as and for the purposes herein set forth and illustrated.

8. A concrete light, vault-cover, or construction wherein the glasses are set in mounts formed to act as stops, substantially as and for the purposes herein set forth and illustrated.

In testimony whereof I affix my signature in presence of two witnesses.

THADDEUS HYATT.

Witnesses:
T. C. BRECHT,
L. W. SINSABAUGH.